United States Patent [19]

Schlenker

[11] Patent Number: 5,014,568

[45] Date of Patent: May 14, 1991

[54] DEFLECTOR FOR BALL SCREW AND NUT ASSEMBLY

[75] Inventor: Theodore R. Schlenker, Troy, Mich.

[73] Assignee: Dana Corporation, Toledo, Ohio

[21] Appl. No.: 486,626

[22] Filed: Feb. 28, 1990

[51] Int. Cl.$^5$ .................. F16H 1/18; F16H 55/00
[52] U.S. Cl. .................. 74/424.8 R; 74/459
[58] Field of Search .................. 74/424.8 R, 459

[56] References Cited

U.S. PATENT DOCUMENTS

| | | | |
|---|---|---|---|
| 2,505,131 | 4/1950 | Means | 74/459 |
| 2,636,397 | 4/1953 | Jacubenta | 74/459 |
| 2,979,071 | 4/1961 | Herring et al. | 74/459 X |
| 3,529,486 | 9/1970 | Galonska et al. | 74/459 |
| 3,661,030 | 5/1972 | Gagne | 74/459 |

Primary Examiner—Allan D. Herrmann
Assistant Examiner—David W. Laub
Attorney, Agent, or Firm—F. B. McDonald

[57] ABSTRACT

A ball deflector for a recirculating ball screw and nut assembly provides a plurality of adjustable semi-spherical locator bosses along an elongated body portion thereof for enhancing fitment of said deflector within a segment of the nut groove during assembly. In a preferred form, the bosses are disposed in adjacent quadrants on an upper body portion of the elongated deflector body, and are arranged in pairs, each disposed at opposite ends of the deflector body and located adjacent the ends of the deflector. The bosses are adjusted by a grinder or other metal removal device to compensate for tolerance variations.

10 Claims, 1 Drawing Sheet

DEFLECTOR FOR BALL SCREW AND NUT ASSEMBLY

BACKGROUND OF THE INVENTION

This invention relates to ball screw and nut assemblies. More particularly, the invention relates to an improved ball deflector employed in such assemblies.

Ball screw and nut assemblies include deflectors for the purpose of ensuring efficiency of ball transfer between return tubes and associated ball passages formed by helical grooves provided in the screw and nut. A major deficiency relates to the fit-up or fitment of such deflectors during assembly of the ball screw and nut assembly. Those skilled in the art will appreciate the long standing practice of attempting to fit an elongate body of a deflector into a nut groove so as to cause the latter to be symmetrically seated and aligned within the screw groove. An inherent problem in such fit-up relates to cumulative manufacturing tolerances. The deflector typically includes a threaded stem fixed to the deflector body for securement of the body within the groove. During securement of the stem to the nut by means of threaded fasteners, manufacturing tolerances tend to give rise to an objectionable amount of cocking or shifting (about the stem axis) of the deflector body within the groove. A substantial improvement would result if there were provided a mechanical means to alleviate or minimize such movement during fit-up of the deflector body within the nut groove.

SUMMARY OF THE INVENTION

The improved ball deflector of the present invention provides at least one pair of adjustable locator bosses, each of the pair disposed on adjacent upper quadrants of the circumference of the deflector body. In a preferred form, the ball deflector is mounted within the nut of a recirculating ball screw and nut assembly, the deflector having an elongate body adapted for cooperation with balls moving within a ball passage formed by a segment of cooperating helical grooves in the screw and nut. A threaded stem fixed to the deflector body secures the body to the nut, the stem being operative to maintain the body fixed relative to the nut by means of a conventional threaded fastener.

In a preferred form, the deflector body has two pairs of the locator bosses fixed to opposite sides of, and opposite ends of, the elongate deflector body. The bosses are disposed on adjacent quadrants of the upper half of the elongate body and are adapted for seating the body within the groove of the nut during assembly. The bosses are adjusted by a grinder to accommodate tolerance variations encountered during assembly.

DETAILED DESCRIPTION OF A PREFERRED EMBODIMENT

Figure 1:
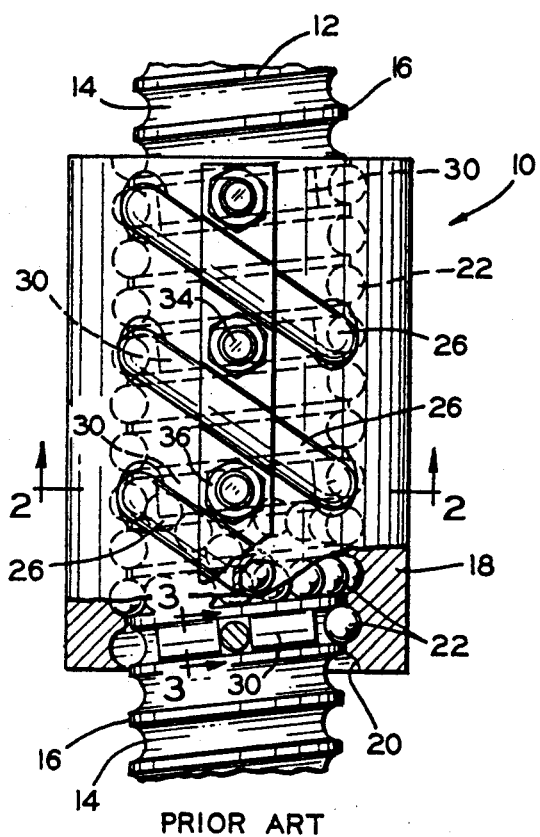
FIG. 1 is a fragmentary plan view of a prior art ball screw and nut assembly of the type in which a preferred embodiment of the deflector of present invention may be utilized.

Referring initially to FIG. 1, a prior art recirculating ball screw and nut assembly 10 is shown fragmentarily. The assembly 10 includes an elongated screw 12 which has a continuous helical groove 14 delineated by a continuous helical land 16. A traveling nut 18 is adapted to move axially along the screw, the nut defining an interior mating helical groove 20. Typically, such prior art nut would also include a flange (not shown) for providing actuation of a rod or coupling assembly mechanically fastened to the flange. Disposed within the mating grooves 14, 20 of nut and screw, for providing relatively frictionless rolling contact therebetween, are a plurality of ball bearings 22 (hereinafter referred to as balls). The balls 22 traverse a helical path within the mating grooves, and a plurality of transfer tubes 26 are arranged to provide a like plurality of endless groups (called trains) of circulating balls which loop through the nut and transfer tubes. In the assembly 10 as shown, three such tubes 26 are utilized, hence there are three trains of bearing balls adapted for circulation through the cooperating grooves between the screw and nut.

Figure 2:
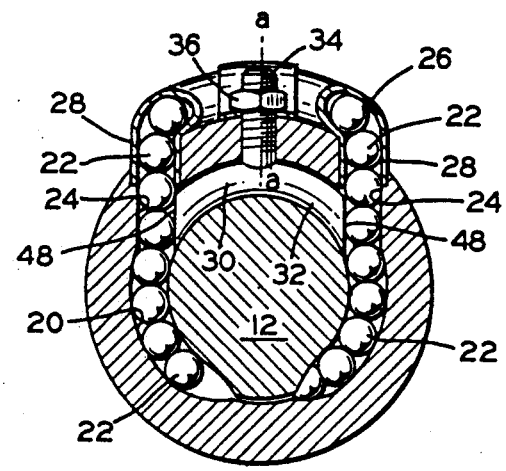
FIG. 2 is a cross sectional view along lines 2—2 of FIG. 1.

Referring now to FIG. 2, each nut contains an aperture 24 at the locations where an end 28 of a transfer tube interfaces with the nut. The view depicted in FIG. 2, while appearing to show one of the three loops, actually depicts partial views of two separate loops. This may be appreciated by those skilled in the art by reference to the cross section 2—2 of FIG. 1 from which FIG. 2 is taken. However, for convenience, the view of FIG. 2 will be treated as a single one of the three continuous or endless trains of balls 22.

Referring now to both FIGS. 1 and 2, it will be apparent that four ball deflectors 30 are employed (FIG. 1). Each ball deflector 30 has an elongate body 32 retained within the mating helical grooves of the screw and nut. An integral ball deflector stem 34 has an exterior threaded surface which receives a conventional threaded fastener 36 for retaining each deflector 30 rigidly within the groove 20 of the nut 18. The deflector body 32 contains bevelled ends 48 adapted to deflect each of the circulating train of balls 22 which pass through the mating grooves, so that the balls pass out of the nut and into the transfer tube though the apertures 24. Thus, each deflector acts to provide a closed loop or circuit for each of the three passages in the nut. The two deflectors located at the opposite ends of the nut 18 each employs only one of its two bevelled ends 48, as will be appreciated by those skilled in the art.

Figure 3:
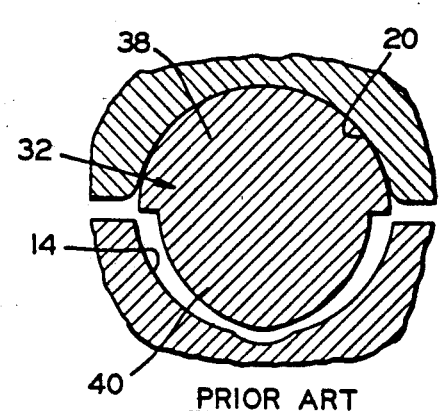
FIG. 3 is a cross sectional view along lines 3—3 of FIG. 1.

Referring now to FIG. 3, the body 32 of the prior art deflector 30 is more fully shown in its operative environment between nut and screw grooves 20 and 14, respectively. FIG. 3 depicts the traditional prior art approach in which the upper body portion 38 is adapted to fit snugly in the nut groove, the upper body having a significantly greater circumferential dimension than the lower body portion 40. As is typical of the latter construction, the lower body portion 40 is formed to provide greater clearance from the sides of the mating groove 14 of the screw for accommodating axial and radial movement or lash in the screw relative to the nut to avoid binding of the screw on the deflector member.

A major drawback with the aforedescribed approach, however, is in its fitment limitation to a singular groove-ball size. Even more of a problem, however, is the fact that cumulative tolerance variations in deflector and nut groove sizing is such that rarely is there a satisfactory deflector fitment. Consequently, upon tightening the threaded fastener 36 on the stem 34 during assembly, the elongate body 32 is often rotated about the axis a—a of the stem, resulting in deflector ends 48 which are not aligned with the nut groove. As a result, the working action of the deflector is compromised and maximum efficiency or smoothness in circulation of the balls is inhibited.

Figure 4:
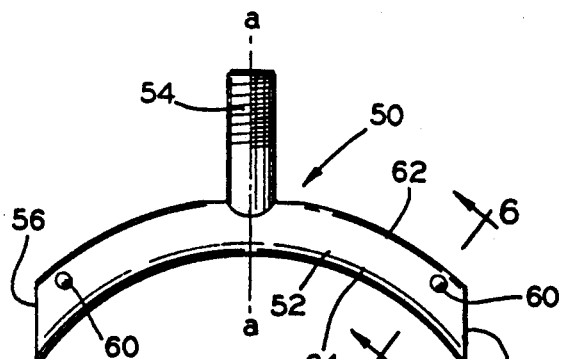
FIG. 4 is an elevational view of a preferred embodiment of the ball deflector of the present invention.
Figure 5:
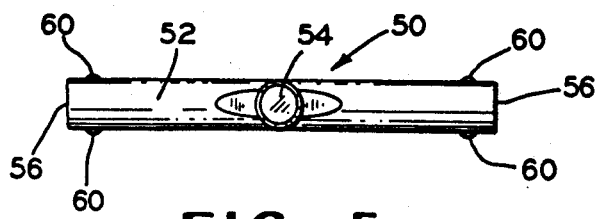
FIG. 5 is a plan view of the preferred ball deflector of FIG. 4.
Figure 6:
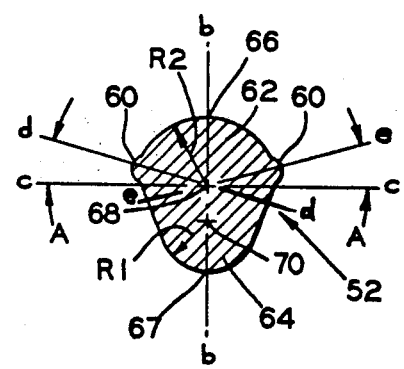
FIG. 6 cross sectional view along lines 6—6 of FIG. 4.

Referring to FIGS. 4, 5, and 6, a preferred embodiment of the deflector 50 of the present invention is now shown and described.

The deflector 50 incorporates an elongate body 52, wherein a threaded stem 54 is rigidly affixed to the body 52, preferably integral therewith. At the ends of the body 52 are deflector ends 56 which function similarly to the ends 48 of the prior art version just described. However, the improved deflector 50 incorporates pairs of adjustable locator bosses 60 situated at opposite ends of the body 52 and in close proximity to the ends 56. The bosses are semi-spherical in their preferred form.

During assembly, the bosses 60 are adjusted by an electric grinder or other metal removal means to assure satisfactory deflector alignment with the nut groove. Although the bosses may be applied to the elongate body 52 by spot weld techniques, the entire deflector 50, including the bosses, is ideally a solid precision cast part.

Referring to FIG. 6 which depicts a cross section of the body 52 taken through a pair of the bosses 60, those skilled in the art will appreciate that an upper body portion 62 is adapted to be seated in the prior art nut groove 20, while the lower body 64 is adapted to be received in the groove 14 of a conventional screw. As will be appreciated, the adjustable bosses 60 offer a greater flexibility in accommodating tolerance variations.

In the preferred embodiment of FIGS. 4, 5, and 6, a total of two pairs, or four bosses, are utilized with the bosses situated in adjacent quadrants of the upper body 62. Ideally, the bosses are symmetrically positioned on the upper body in a manner such that the two equal angles A equal 10 to 25 degrees (FIG. 6). Angles A are formed by the intersection of lines c—c and d—d which pass through the left boss 60, (located left of the vertical centerline b—b), and by the intersection of lines c-c and e≧e, the latter of which passes through the center of the right boss 60 (located on the right side of line b—b).

The upper and lower bodies 62 and 64 are symmetrically positioned with respect to each other. The bodies are generally semi-cylindrical, the upper body having a greater radius than the lower. The radius of the upper body 62 emanates from an upper body center 68, while the lower body 64 radius emanates from the center 70. To the extent that there is a slight offset between the two centers 68 and 70, the upper and lower body portions are symmetrically joined together by a portion having exterior contours which are tangent to the lower body 64. The relative height of the body 52 as measured between the upper extremity 66 and lower extremity 67 along vertical centerline b—b is approximately 95% of the diameter of a selected ball size.

The radius R1 of the lower body 64 is approximately 30 percent of the ball diameter, while the radius R2 of the upper body 62 may range from approximately 35 to 50 percent of the ball diameter. The initial or unadjusted radius of the bosses 60 is approximately 0.100 inch. The aforedescribed embodiment has an overall vertical height of approximately 0.6 inch and was designed for a ball screw assembly which utilizes ⅜ inch diameter balls.

Although only one preferred embodiment has been detailed and described herewith, the following claims envision numerous additional embodiments which are not shown or described herein.

What is claimed is:

1. In a ball deflector for a recirculating ball screw and nut assembly, said deflector including an elongate body adapted for placement within a ball passage formed by a segment of cooperating helical grooves in a screw and a nut, said nut being movable along said screw, said deflector defining a body, a stem fixed to said body and adapted for securement of said body to said nut, said stem operative to maintain said body fixed relative to said nut; an improvement comprising said body including at least a pair of adjustable locator bosses disposed for engaging the groove of the nut, each boss disposed in adjacent quadrants on the circumference of said body.

2. The ball deflector of claim 1 wherein said deflector body comprises two pairs of said locator bosses fixed to opposite sides of, and at opposite ends of, said elongated body.

3. The ball deflector of claim 2 wherein said deflector body comprises integral upper and lower body portions, each portion defining a generally semi-cylindrical member, wherein said bosses are located on the quadrants defined by said upper body portion.

4. The ball deflector of claim 3 wherein said upper body portion comprises a larger radius than that of said lower body portion, wherein centers of said radii are spaced apart along a vertical centerline passing through upper and lower extremities of said body.

5. The ball deflector of claim 4 wherein each of said bosses lies on an angle of 10 to 25 degrees as measured from a line which passes through the center of the upper body, said line being orthogonal to said vertical centerline.

6. The ball deflector of claim 5 wherein said recirculating ball screw and nut assembly comprises a plurality of recirculating balls, and wherein said radius of said lower body portion comprises approximately 30% of said ball diameter.

7. The ball deflector of claim 6 wherein said radius of said upper body comprises approximately 35 to 50% of said ball diameter.

8. The ball deflector of claim 7 wherein said bosses are semi-spherical, each having an initial unadjusted radius of approximately 0.100 inch.

9. The ball deflector of claim 8 wherein said deflector stem is integrally attached to said deflector body.

10. The ball deflector of claim 9 comprising a solid precision cast member.

* * * * *